(12) United States Patent
Johnson et al.

(10) Patent No.: US 12,312,202 B2
(45) Date of Patent: May 27, 2025

(54) FIBER DELIVERY SYSTEM

(71) Applicant: SHAW INDUSTRIES GROUP, INC., Dalton, GA (US)

(72) Inventors: Jamie Lynn Johnson, Trenton, GA (US); Eric Walter Thompson, Rock Spring, GA (US)

(73) Assignee: Shaw Industries Group, Inc., Dalton, GA (US)

( * ) Notice: Subject to any disclaimer, the term of this patent is extended or adjusted under 35 U.S.C. 154(b) by 987 days.

(21) Appl. No.: 17/375,824

(22) Filed: Jul. 14, 2021

(65) Prior Publication Data

US 2023/0013361 A1    Jan. 19, 2023

(51) Int. Cl.
*B65H 57/16* (2006.01)
*B65H 57/00* (2006.01)
*B65H 57/28* (2006.01)

(52) U.S. Cl.
CPC ........... *B65H 57/16* (2013.01); *B65H 57/003* (2013.01); *B65H 57/28* (2013.01); *B65H 2701/31* (2013.01)

(58) Field of Classification Search
CPC ...... B65H 57/003; B65H 57/16; B65H 57/06; B65H 57/28; B65H 2701/31; B65H 51/18; D03J 1/14; D02H 9/00–02; D02H 13/16; D02H 13/20; D05C 11/00; D05C 11/08; D05C 11/10; D05C 15/16; D05C 15/18

See application file for complete search history.

(56) References Cited

U.S. PATENT DOCUMENTS 7,506,831 B1 * 3/2009 Weiner ................... D05C 15/18
242/157 R

FOREIGN PATENT DOCUMENTS

| DE | 102015202145 | A1 * | 8/2015 | ........... B65H 57/003 |
| DE | 102014107750 | A1 * | 12/2015 | ............. B65H 54/26 |
| WO | WO-9748548 | A1 * | 12/1997 | ............. B21C 49/00 |

* cited by examiner

*Primary Examiner* — Sang K Kim
*Assistant Examiner* — Nathaniel L Adams
(74) *Attorney, Agent, or Firm* — Ballard Spahr LLP

(57) ABSTRACT

A system for transporting fiber ends can comprise a fiber supply assembly that supplies fiber along a first axis. A plurality of eyeboards can be positioned along the first axis. Each eyeboard can define a plurality of openings therethrough. Each opening of the plurality of openings can be configured to receive therethrough a fiber from the fiber supply assembly. A track can extend along the first axis. The track can pass proximate to each eyeboard of the at least one eyeboard. A carriage can be movable along the track. The carriage can define at least one fiber attachment element. An actuator can be configured to move the carriage along the track.

20 Claims, 8 Drawing Sheets

FIBER DELIVERY SYSTEM

FIELD

This application relates generally to apparatuses and systems for transporting fibers during textile manufacturing.

BACKGROUND

Fiber is often fed from fiber packages (or bobbins) on a creel, beam, or other fiber supply assembly to a beamer, warper, or other textile manufacturing device. Typically, one or more eyeboards define a plurality of openings that receive respective fibers to guide the fibers along a path from the creel to the textile manufacturing device. The eyeboards maintain the fiber ends in an arrangement that keeps the fibers organized and inhibits crossing fibers. The eyeboards are typically positioned at a substantial height to maintain the fibers out of the way of operators on the manufacturing floor. Often, a fiber will break, or a new fiber will need to be run from the creel to the textile manufacturing device. In order to do so, the operator has to pull a fiber end to the eyeboard, thread the fiber end through the eyeboard, (often, climbing up and down a ladder at each eyeboard, holding the fiber end) and repeat for the number of eyeboards that need to be threaded. Typically, the fibers cannot be pulled between eyeboards at the height of the operator. Rather, the operator must pull the fiber at approximately the height of the eyeboard, either causing unergonomic stress or requiring a cumbersome apparatus (e.g., a reach extension tool having a long arm) for pulling the fiber at the eyeboard height. Thus, a method of safely and easily transporting the fiber ends between eyeboards is desirable.

SUMMARY

Described herein, in various aspects, a system for transporting fiber can comprise a fiber supply assembly that supplies fiber along a first axis. At least one eyeboard can be positioned along the first axis. Each eyeboard can define a plurality of openings therethrough. Each opening of the plurality of openings can be configured to receive therethrough a fiber from the fiber supply assembly. A track can extend along the first axis. The track can pass proximate to each eyeboard of the at least one eyeboard. A carriage can be movable along the track. The carriage can define at least one fiber attachment element. An actuator can be configured to move the carriage along the track.

A method of using the system can comprise coupling a free end of a fiber to the carriage and causing the carriage to move along the track in a first direction until the carriage is proximate an eyeboard of the at least one eyeboard. The method can further comprise decoupling the free end of the fiber from the carriage and feeding the free end of the fiber through an opening of the eyeboard.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

These and other features of the preferred embodiments of the invention will become more apparent in the detailed description in which reference is made to the appended drawings wherein.

DETAILED DESCRIPTION

Figure 1:
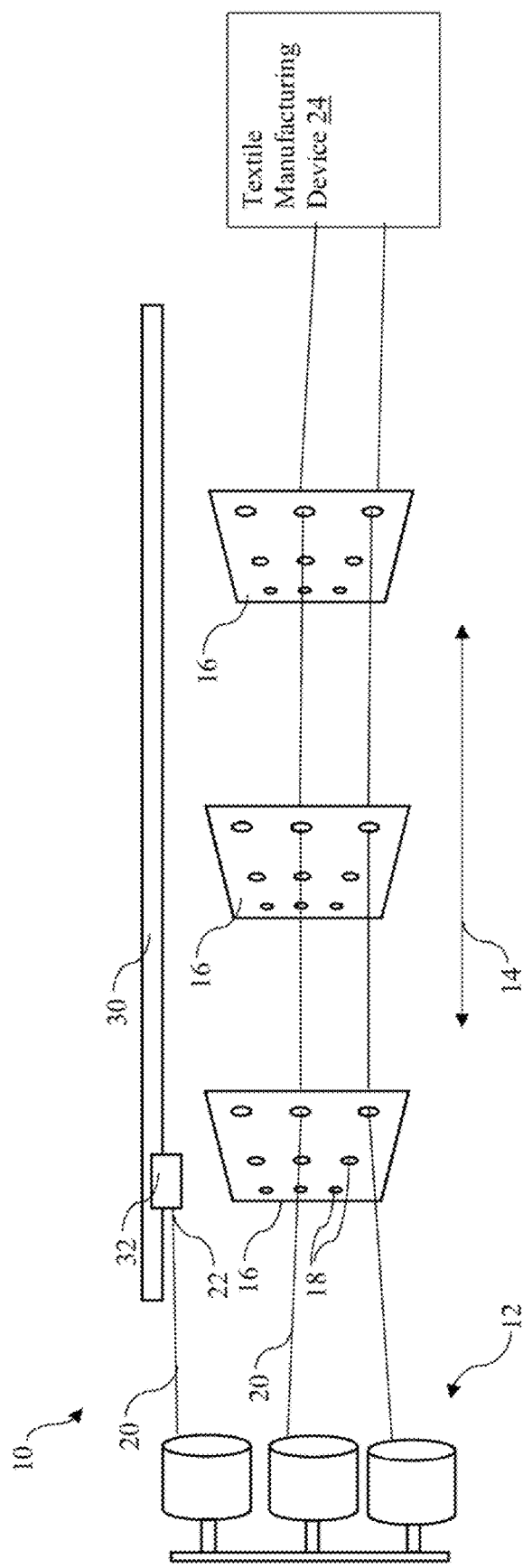
FIG. 1 is a schematic diagram of a system as disclosed herein.
Figure 2:
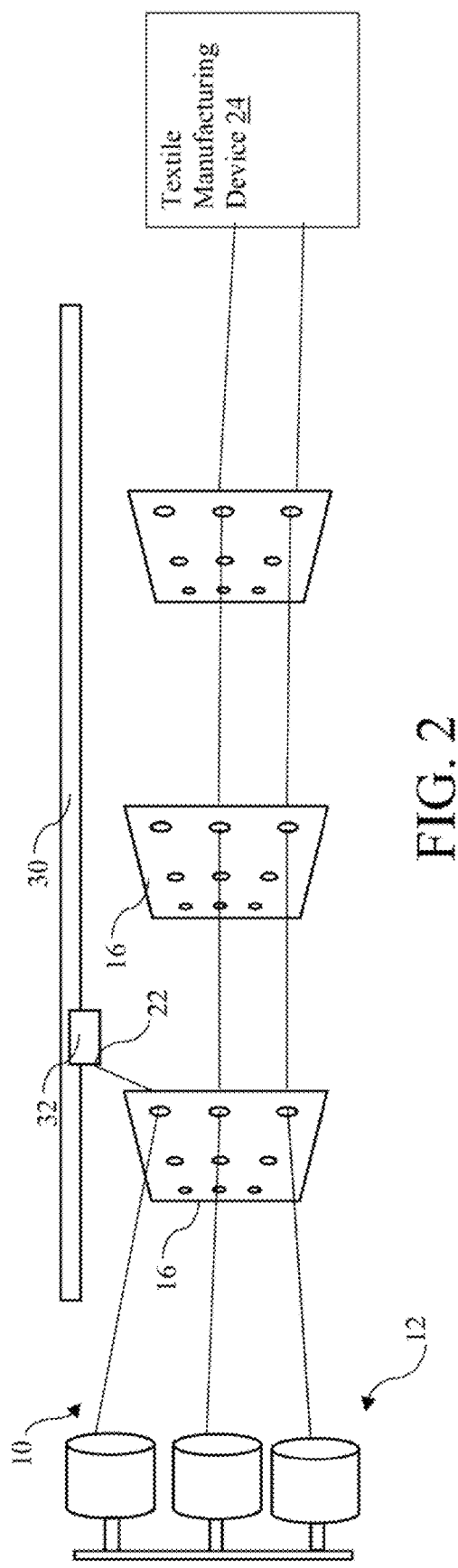
FIG. 2 is the schematic diagram of the system of FIG. 1 with the fiber threaded through a first eyeboard.
Figure 3:
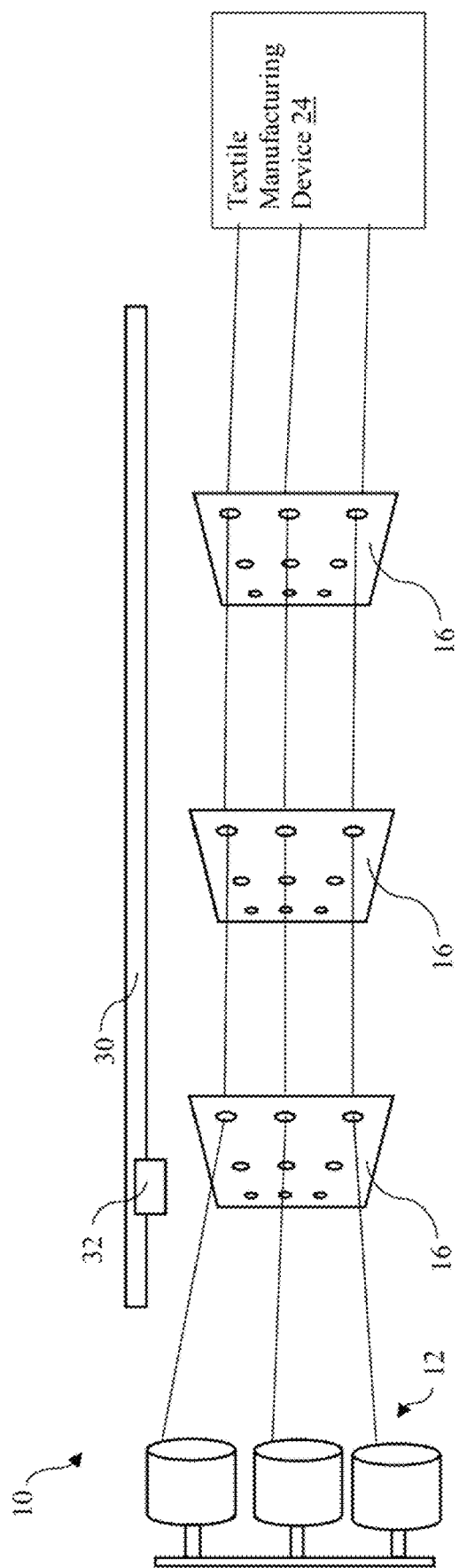
FIG. 3 is the schematic diagram of the system of FIG. 1 with the fiber threaded through all of the eyeboards.

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

It must be noted that as used herein and in the appended claims, the singular forms "a", "an," and "the" include plural references unless the context clearly dictates otherwise. Thus, for example, reference to "an eyeboard" includes one or more of such eyeboards, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," or "generally." it is contemplated that values within up to 15%, up to 10%, up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises." means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

As used herein, "pulley" should be understood to include a sheave or pulley wheel or any rolling element that is configured to engage a belt or cable.

Referring to FIG. 1, a system 10 can have a creel or other fiber supply assembly 12 that supplies fiber along a first axis 14. As used herein, the term "fiber" refers to a thread, a filament, or a group of associated threads and/or filaments from which a textile (e.g., floor covering) can be formed. In some optional aspects, the fiber can comprise, or be embodied as, a long continuous length of interlocked fibers, such as yarn. Thus, in the current disclosure, unless the context indicates otherwise, when the term "fiber" is used to describe features or components in a particular embodiment, additional embodiments in which the term "yarn" replaces the term "fiber" are specifically contemplated and considered disclosed.

In various aspects, the fiber supply assembly 12 can comprise one or more racks, each rack having a plurality of fiber package engagement structures that are configured to engage respective fiber packages (e.g., bobbins). The fiber supply assembly 12 can further comprise a plurality of fiber packages on some or all of the fiber package engagement structures. In further aspects, the fiber supply assembly 12 can comprise a beam around which fiber is wound. At least one eyeboard 16 can be positioned along the first axis 14. In some aspects, the system can have a single eyeboard 16. In further aspects, the system 10 can comprise a plurality of eyeboards 16. Each eyeboard 16 can define a plurality of openings 18 therethrough. The openings 18 can be configured to receive therethrough a respective fiber 20 from the fiber supply assembly 12. A respective fiber end 22 of each fiber 20 from the fiber supply assembly 12 can be fed from the through each of the eyeboards 16 and to a beamer, warper, or other textile manufacturing device 24. Optionally, the textile manufacturing device 24 can be used to manufacture a floor covering or portion of a floor covering.

Figure 4:
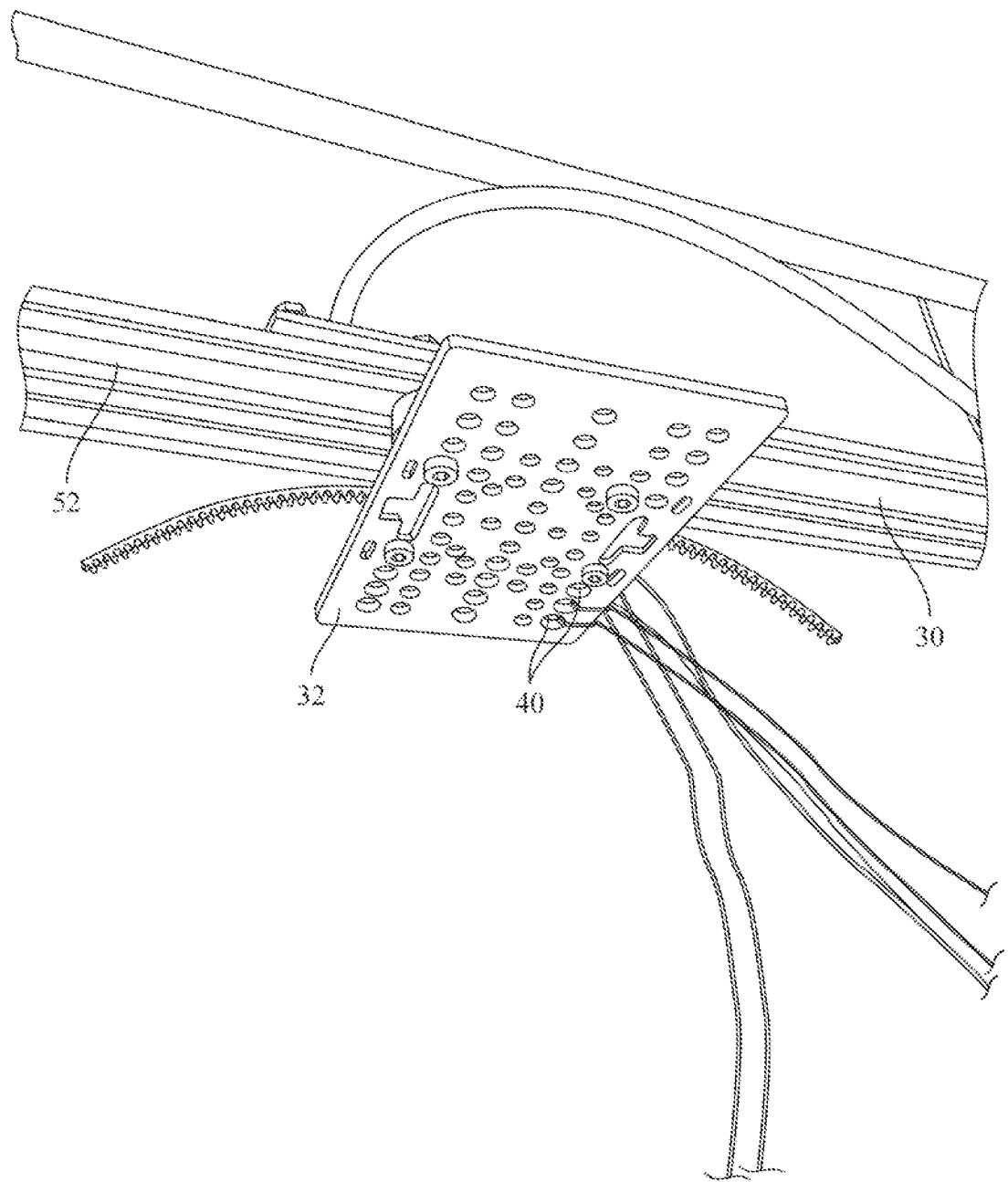
FIG. 4 is an underside perspective view of a carriage and a portion of a track of an exemplary system as disclosed herein.
Figure 5:
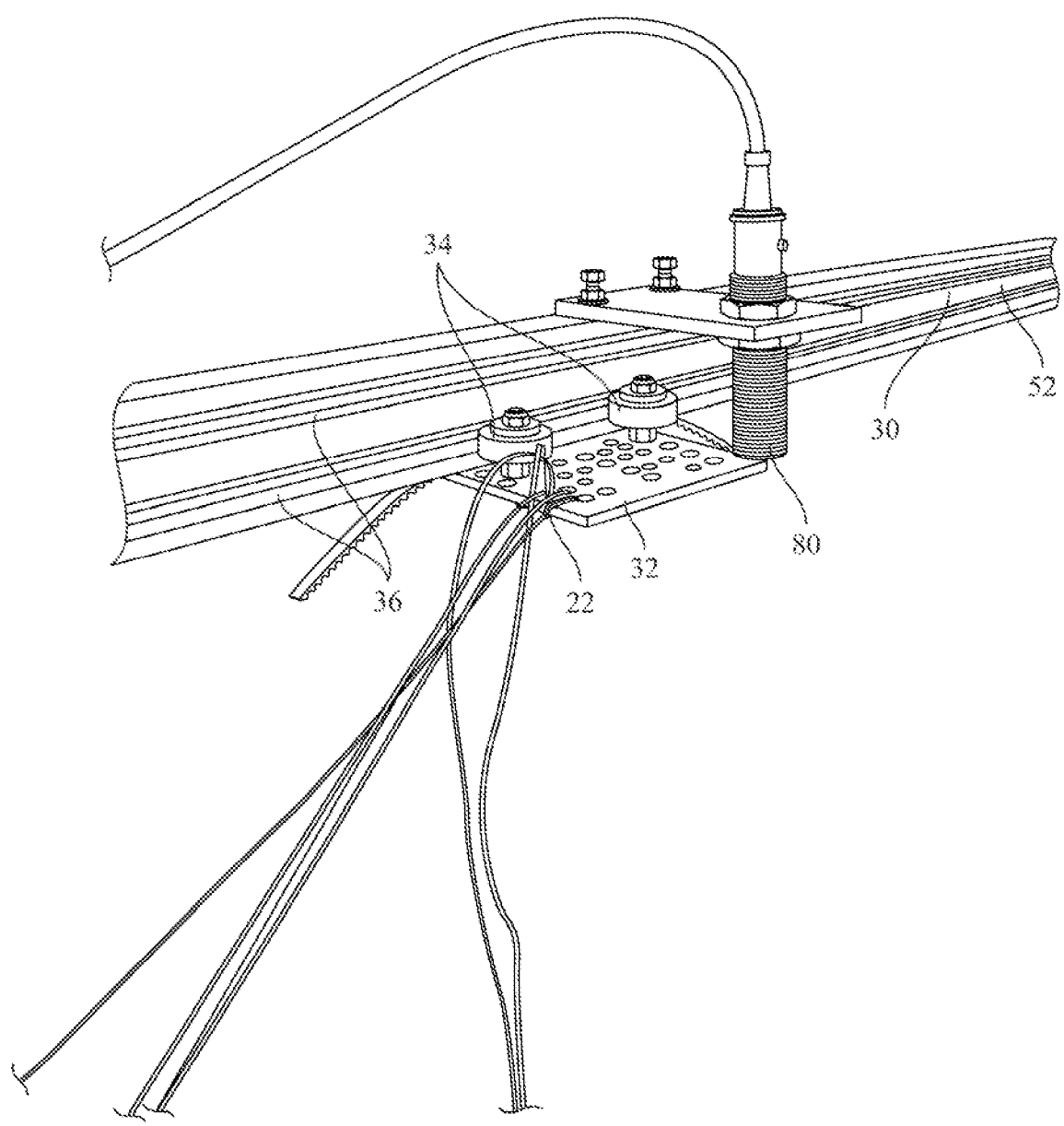
FIG. 5 is a top perspective view of the carriage and track of FIG. 4.

Referring also to FIGS. 4-5, a track 30 can extend along the first axis 14. The track 30 can pass proximate to each eyeboard 16. A carriage 32 can be movable along the track 30. An actuator 38 (FIGS. 6-9) can be configured to move the carriage 32 along the track 30.

The carriage 32 can define at least one fiber attachment element 40 or, optionally, a plurality of fiber attachment elements 40. In some optional aspects, the fiber attachment element(s) 40 can be a hole through which a fiber can be inserted or tied. In further aspects, the fiber attachment element 40 can comprise a clip. In still further aspects, the fiber attachment elements 40 can be a plurality of books (e.g., wire hooks) to which fiber can be tied, looped around, or otherwise coupled. In yet further aspects, the fiber attachment element 40 can comprise adhesive tape. In further aspects, the fiber attachment elements 40 can be actuated (e.g., electrically or pneumatically actuated) clamps or grippers.

Figure 6:
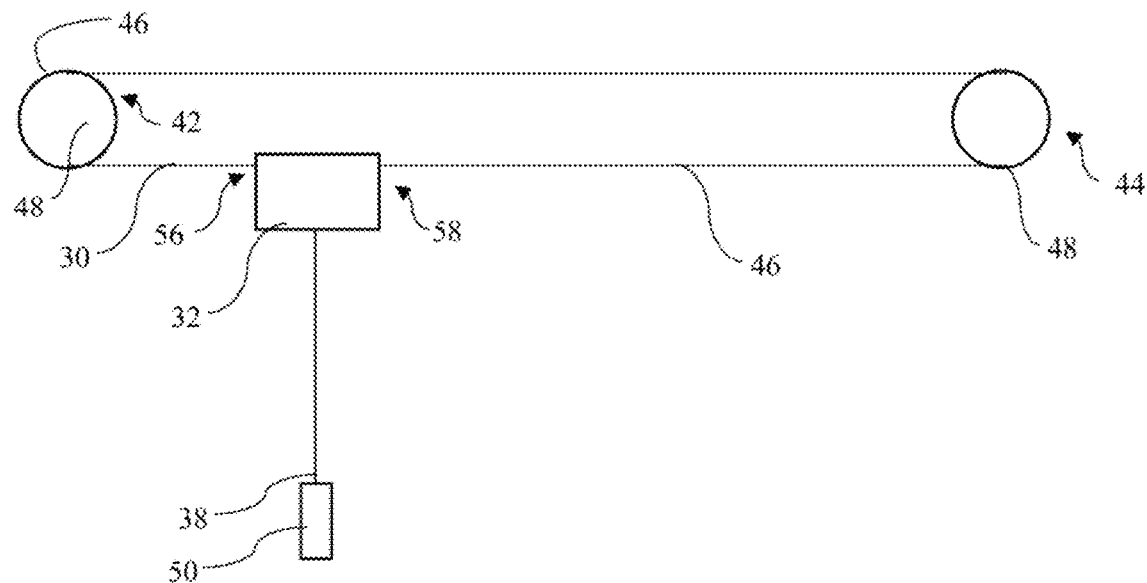
FIG. 6 is a schematic diagram of an exemplary system in accordance with embodiments disclosed herein.
Figure 7:
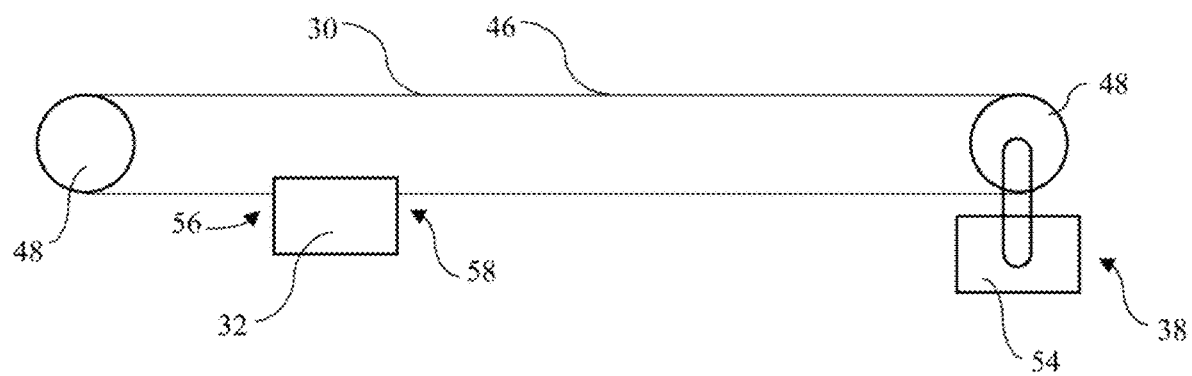
FIG. 7 is a schematic diagram of an exemplary system in accordance with embodiments disclosed herein.

Referring to FIGS. 6 and 7, in some aspects, the track 30 can comprise a belt or cable 46. For example, the track 30 can have a first end 42 and a second end 44. Optionally, the carriage can comprise rollers 34 that roll along the belt or cable 46. In further aspects, a pulley 48 can be positioned at each of the first and second ends 42, 44 of the track, and the belt or cable 46 can be looped around the pulley 48. The carriage 32 can be fixedly coupled to the belt or cable 46 so that movement of the belt or cable effects movement of the carriage 32.

In some optional aspects, the actuator 38 can comprise a hand grip 50 that is coupled to the carriage 32. The hand grip 50 can be configured to permit an operator to manually pull the carriage along the track.

In further aspects, at least one pulley 48 can be coupled to a motor 54, wherein rotation of the motor effects rotation of the coupled pulley. The belt or cable 46 can have a first end 56 that is coupled to the carriage 32 on a first side, and a second end 58 that is coupled to the carriage 32 on a second side. Rotation of said pulley 48 that is coupled to the motor in a first rotational direction can move the belt or cable 46, thereby pulling the carriage in a first lateral direction. Rotation of said pulley 48 in the opposite rotational direction can pull the carriage in an opposite second lateral direction.

Referring to FIGS. 4 and 5, in further aspects, the track 30 can comprise a beam 52. In some optional aspects, the carriage 32 can comprise at least one roller 34 that is configured to roll along the track. The beam 52 can optionally define at least one slot 36 extending along the first axis through which at least a portion of the carriage 32 can be received. For example, opposing rollers 34 can be received in slots 36 on opposing lateral sides of the beam 52. In further aspects, the rollers can bias against a top surface of the beam 52.

Figure 8:
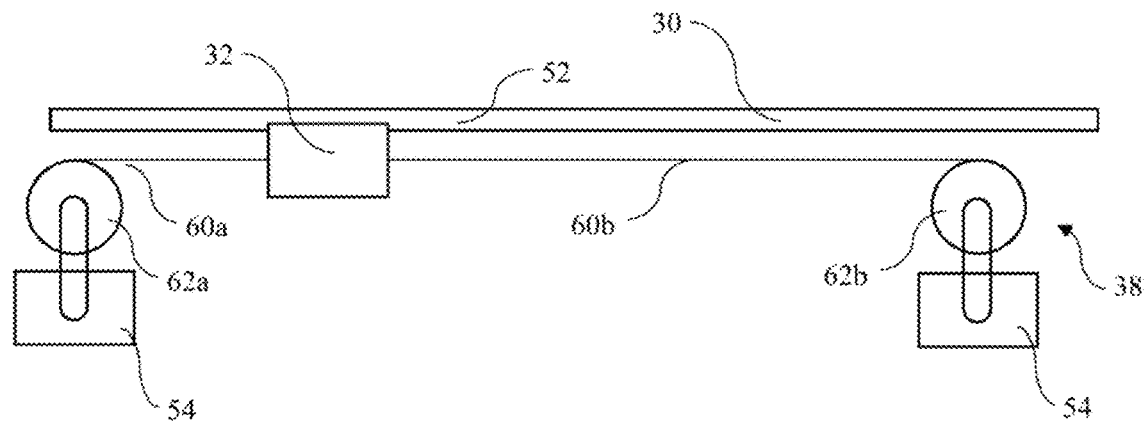
FIG. 8 is a schematic diagram of an exemplary system in accordance with embodiments disclosed herein.

Referring also to FIG. 8, the actuator 38 can comprise a first tether 60a, such as, for example, a belt or cable. The actuator 38 can further comprise a first winch 62a that is configured to wind the first tether 60a therearound. Rotation of the first winch 62a in a winding rotational direction can cause the first tether to wind around the first winch, thereby pulling the carriage in the first lateral direction. Optionally, in further aspects, the actuator 38 can comprise a second tether 60b that is coupled to the carriage. The actuator 38 can comprise a second winch 62b that is configured to wind the second tether 60b therearound. Rotation of the second winch 62b in a winding rotational direction can cause the second tether 60b to wind around the second winch 62b, thereby pulling the carriage 32 in the second lateral direction. A respective motor 54 can be configured to effect rotational movement of the first and second winches 62a,b.

Referring to FIG. 7, in further aspects, the actuator 38 can comprise a pair of pulleys 48 positioned at, or proximate to, the first and second ends of the track. A belt or cable 46 can extend around each of the pulleys 48. The belt or cable 46 can have a first end 56 that is coupled to the carriage 32 on a first side, and a second end that is coupled to the carriage 32 on a second side. At least one pulley 48 can be coupled to a motor 54. The motor 54 can be configured to cause the coupled pulley to rotate in a first rotational direction to pull the carriage in the first linear direction. In further aspects, the motor 54 can be configured to rotate in an opposite second rotational direction, thereby pulling the carriage in the second linear direction.

Optionally the belt or cable 46 can be a belt defining teeth. At least one pulley 48 can define corresponding teeth to thereby inhibit slipping between the belt and the pulley.

In optional aspects, the motor(s) 54 can be stepper motors that are in communication with the computing device 1001 further disclosed herein. In this way, angular rotation of the coupled pulley or winch can be known, and said angular rotation can be correlated, based on the circumference of the coupled pulley or winch, to linear movement of the carriage. For example, a single rotation of a pulley having a circumference can cause linear movement of the carriage by said circumference.

Figure 10:
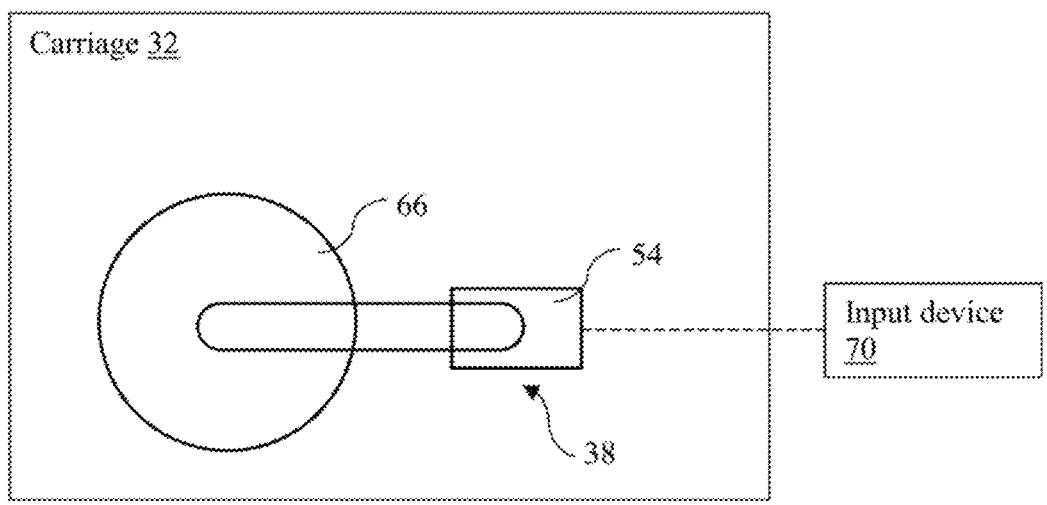
FIG. 10 is a schematic diagram of an exemplary carriage having a motorized wheel as disclosed herein.

Referring to FIG. 10, in further optional aspects, the carriage 32 can comprise one or more wheels 66 that are in engagement with the track 30 (FIG. 4). The actuator 38 can comprise a motor 54 that is coupled to at least one of the wheels 66. The wheel(s) 66 can be in engagement with the track. The motor 54 can be configured to drive the coupled wheel(s) 66 to thereby move the carriage 32 along the track. Optionally, said motor 54 that is coupled to the wheels 66 can be a stepper motor.

Figure 9:
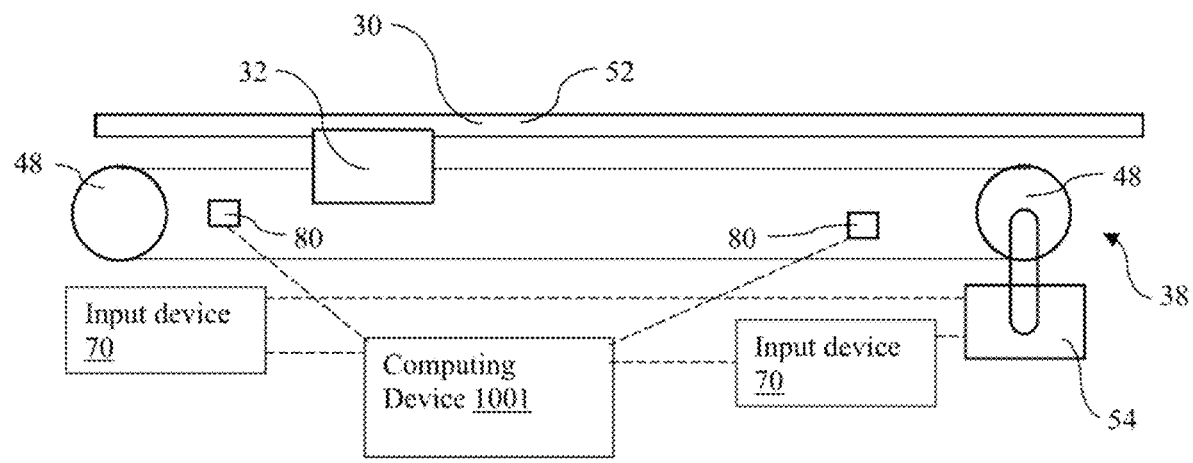
FIG. 9 is a schematic diagram of an exemplary system in accordance with embodiments disclosed herein.

Referring to FIG. 9, optionally, the carriage 32 can be supported from the beam 52 at least partially by magnetic levitation. For example, the track 30 and carriage 32 can cooperate to provide electromagnetic suspension or electrodynamic suspension technology. In this way, the carriage and track can provide a quiet, smooth, and reliable system that is configured for rapid movement of the carriage. Optionally, magnetic forces can be used to propel the carriage 32 along the track in addition to levitating the carriage 32. In further aspects, magnetic forces can propel the carriage, wherein the carriage is not magnetically levitating from the track. Additional details for implementing magnetic levitation are provided in Yaghoubi, Hlamid. "The most important maglev applications." *Journal of Engineering* 2013 (2013), which is hereby incorporated by reference herein in its entirety.

In various aspects, the system 10 can comprise an input device 70 that is configured to receive a user input and, in response to receiving the user input, cause the actuator to move the carriage along the track. For example, the input device 70 can be in communication with at least one motor 54 and can cause the motor to actuate to move the carriage. Optionally, the input device can comprise a switch. For example, the input device can be a momentary switch that, when actuated (e.g., depressed), causes the motor 54 to rotate in a first direction. Optionally, the input device can comprise a first momentary switch that causes the motor 54 to rotate in a first direction and a second momentary switch that causes the motor 54 to rotate in a second direction. Optionally, the input device can be a switch that, when in an on position, provides power to the motor and, when in an off position, ceases power provision to the motor. In further aspects, the input device 70 can send a signal to a controller that causes the motor to rotate in a first or second direction.

In various aspects, the input device 70 can be a switch, a plurality of switches, a joystick, a touchscreen display, a keyboard, a pointing device (e.g., a computer mouse, remote control), a microphone, a scanner, a tactile input device, motion sensor, speech recognition, or any suitable input device. The input device 70 can optionally be embodied at by a smartphone or tablet. In further aspects, the input device can comprise a console having physical switches. The input device 70 can optionally be in communication with the computing device 1001 disclosed herein. The computing device 1001 can receive an input from the input device 70 and cause the carriage to move (e.g., by actuating a motor as disclosed herein).

In various optional aspects, the input device 70 can be configured to receive a first signal, and, in response to receiving the first signal, cause the actuator to move the carriage in a first direction along the first axis. For example, the input device can receive an input from an operator to move the carriage in the first direction. In further aspects, the input device can be configured to receive a second signal and, in response to receiving the second signal, cause the actuator to move the carriage in a second direction that is opposite the first direction.

Figure 11:
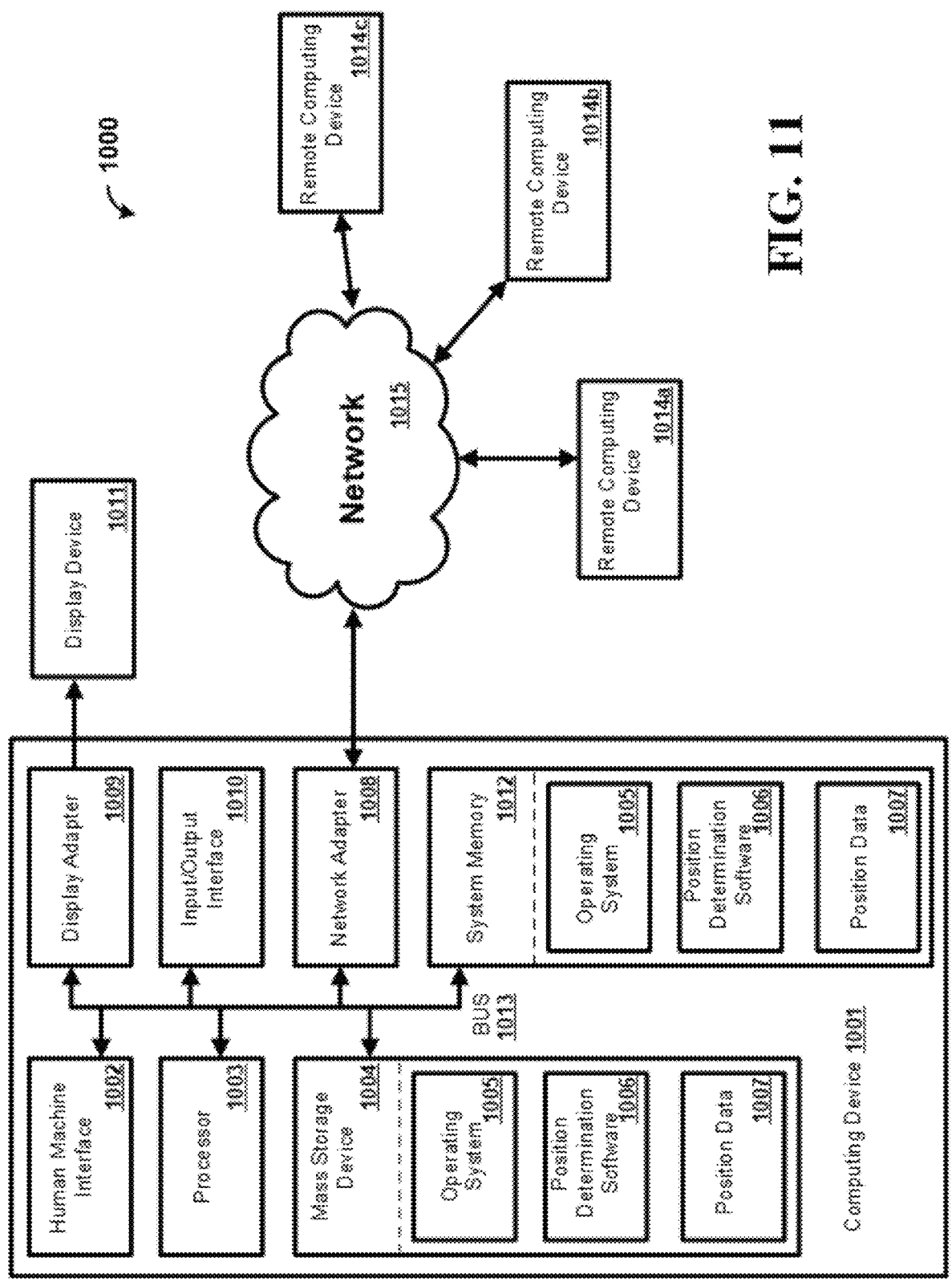
FIG. 11 is a schematic diagram of an exemplary computing system for use with the system as disclosed herein.

In further aspects, the system 10 can comprise a computing system 1000 comprising a computing device 1001 as disclosed further herein with reference to FIG. 11. In various optional aspects, the computing device 1001 can be configured to position the carriage along the track 30. For example, the computing device 1001 can store one or more preset positions. The preset positions can include, for example, a respective position at each eyeboard. Optionally, the preset positions can include a position proximate to the fiber supply assembly 12 and/or a position proximate to the textile manufacturing device 24.

The computing device can comprise a memory (e.g., mass storage device 1004) and at least one processor 1003. The processor(s) 1003 can be in communication with the input device. The processor(s) 1003 can be configured to determine a position of the carriage. The memory can be configured to store at least one preset location identifier. Each preset location identifier can be associated with a respective location of the carriage along the first axis. The input device 70 can be configured to receive a user selection of a preset location identifier of the at least one preset location identifier. An operator can provide an input corresponding to a selection of a preset location identifier (e.g., at a first eyeboard or at a second eyeboard). In response to the input device receiving the selection of the preset location of the at least one preset location, the processor(s) 1003 can be configured to cause the actuator to move the carriage to the preset position. Optionally, the computing device 1001 can store a routine comprising a series of sequential stopping points (e.g., at each sequential eyeboard in the direction from the fiber supply assembly 12 to the textile manufacturing device 24). In these aspects, the carriage can be configured to stop at each sequential eyeboard, and an operator, after threading the fiber through the eyeboard and re-coupling the fiber to the carriage, can initiate movement to the next sequential stopping point.

As described herein, the motor(s) 54 of the actuator 38 can be stepper motors that are in communication with the processor(s) 1003. In some aspects, the computing device 1001 can use the known number of rotations of the stepper motor to determine the position of the carriage along the track. In this way, the computing device 1001 can use feedback from the stepper motor to cause the carriage to move to a particular (e.g., predetermined) location.

Referring also to FIG. 5, in some aspects, the system can comprise at least one limit switch 80. The limit switch 80 can be associated with a respective position of the carriage. The limit switch 80 can be, for example, a proximity sensor, a contact-activated switch, or any suitable switch for detecting a position of the carriage. The limit switch 80 can be in communication with the computing device 1001 and can provide a signal to the at least one processor when the carriage reaches the respective position of the limit switch. Optionally, a first limit switch can be positioned at a first end of the truck, and a second limit switch can be positioned at a second end of the track. In this way, the limit switches can be used to inhibit movement of the carriage beyond the end of the track or otherwise impact an object at the end of the track, thereby causing damage to the track or the carriage. The at least one processor 1003 can be configured to stop movement of the carriage 32 upon receiving a signal from either the first or second limit switch. In further aspects, limit switches or other position sensors can be positioned at predetermined locations of the carriage for enabling the system to detect the arrival of the carriage at a particular limit switch. In this way, the limit switches can provide feedback to enable the system to stop the carriage at predetermined locations.

The system disclosed herein can be used for threading one or more eyeboards 16. This can be done during initial setup as a plurality of fibers are initially fed from the fiber supply assembly to the textile manufacturing device 24. The system can further be used when one or more fibers break, thereby causing a (free) fiber end that needs to be re-strung. Still further, the system can be used for any application in which it is desirable to transport an end of a fiber, string, or filament from a first location to a second location.

Referring to FIGS. 1-3 and 4, according to some aspects, a (free) fiber end can be coupled to the carriage 32. Optionally, a plurality of fiber ends can be coupled to the carriage. For example, the (free) fiber end(s) can be tied, clamped, taped, or otherwise coupled to the fiber attachment element(s) 40 of the carriage. The carriage 32 can be caused to move along the track in a first direction until the fiber is positioned at an eyeboard, thereby delivering the fiber end(s) to the eyeboard. For example, the operator can press a button of the input device 70 (FIG. 9) to move the carriage 32 in the first direction and release the button when the carriage is at or proximate to the first location. In further aspects, the operator can select, via the input device 70 in communication with the computing device 1001, a preset location corresponding to the first position. In still further aspects, the operator can cause the carriage to move to the first location by any other suitable method, including, but not limited to, use of the actuators and input devices described herein.

An operator (optionally, standing on a ladder) can receive the fiber end 22 from the carriage 32 at the first location, decouple the fiber end from the carriage and feed the fiber end through an opening 18 of the eyeboard 16.

Optionally, the operator can then recouple the free end of the fiber to the carriage. The operator can then cause the carriage to continue moving in the first direction. For example, the operator can move the carriage to the next sequential eyeboard 16 along the first axis.

It is contemplated that some or all of the threading of the eyeboards can be performed by the system 10. In some aspects, the carriage 32 can comprise an arm that is configured to deliver fiber through an opening 18 of an eyeboard 16. For example, in some aspects, each attachment element 40 can be a needle that is aligned with a respective opening of an eyeboard. In further aspects, each attachment element 40 can be a gripper (or other end effector) of a robotic arm. In some aspects, each attachment element (e.g., the needle or gripper can be coupled to an actuator (e.g., a multi-axis arm or a linear actuator) that is configured to move the attachment element transversely to the longitudinal axis of the track to align the attachment element with a select opening of the eyeboard. In some optional aspects, the system 10 can comprise a plurality of carriages. For example, the system can comprise a first carriage and a second carriage. In some aspects, the first carriage can deliver the fiber end to the second carriage through a first eyeboard, and the second carriage can receive the fiber end. The second carriage can then move to a second eyeboard. Three or more carriages can be included for transfer of fiber between additional eyeboards. In some aspects, the plurality of carriages can move along the same track 30. In further aspects, each carriage can move along a respective track, and the respective tracks can be positioned end-to-end.

Computing Device

FIG. 11 shows a computing system 1000 including an exemplary configuration of a computing device 1001 for use with the system 10. In some aspects, the computing device 1001 can be integral to the system 10 via a stand-alone device. In further aspects, it is contemplated that a separate computing device, such as, for example, a tablet, smartphone, laptop, or desktop computer can communicate with the system 10 and can enable the user to interface with the system 10.

The computing device 1001 may comprise one or more processors 1003, a system memory 1012, and a bus 1013 that couples various components of the computing device 1001 including the one or more processors 1003 to the system memory 1012. In the case of multiple processors 1003, the computing device 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computing device 1001 may operate on and/or comprise a variety of computer readable media (e.g., non-transitory). Computer readable media may be any available media that is accessible by the computing device 1001 and comprises, non-transitory, volatile and/or non-volatile media, removable and non-removable media. The system memory 1012 has computer readable media in the form of volatile memory, such as random access memory (RAM), and/or non-volatile memory, such as read only memory (ROM). The system memory 1012 may store data such as carriage position data 1007 (e.g., data from position sensors as disclosed herein) and/or program modules such as operating system 1005 and carriage position determination software 1006 that are accessible to and/or are operated on by the one or more processors 1003.

The computing device 1001 may also comprise other removable/non-removable, volatile/non-volatile computer storage media. The mass storage device 1004 may provide non-volatile storage of computer code, computer readable instructions, data structures, program modules, and other data for the computing device 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004. An operating system 1005 and carriage position determination software 1006 may be stored on the mass storage device 1004. One or more of the operating system 1005 and carriage position determination software 1006 (or some combination thereof) may comprise program modules and the carriage position determination software 1006. The carriage position data 1007 may also be stored on the mass storage device 1004. The carriage position data 1007 may be stored in any of one or more databases known in the art. The databases may be centralized or distributed across multiple locations within the network 1015.

A user may enter commands and information into the computing device 1001 using an input device (not shown). Such input devices comprise, but are not limited to, a joystick, a touchscreen display, a keyboard, a pointing device (e.g., a computer mouse, remote control), a microphone, a scanner, tactile input devices such as gloves, and other body coverings, motion sensor, speech recognition, and the like. These and other input devices may be connected to the one or more processors 1003 using a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 using an interface, such as a display adapter 1009. It is contemplated that the computing device 1001 may have more than one display adapter 1009 and the computing device 100I may have more than one display device 1011. A display device 1011 may be a monitor, an LCD (Liquid Crystal Display), light emitting diode (LED) display, television, smart lens, smart glass, and/or a projector. In addition to the display device 1011, other output peripheral devices may comprise components such as speakers (not shown) and a printer (not shown) which may be connected to the computing device 1001 using Input/Output Interface 1010. Any step and/or result of the methods may be output (or caused to be output) in any form to an output device. Such output may be any form of visual representation, including, but not limited to, textual, graphical, animation, audio, tactile, and the like. The display 1011 and computing device 1001 may be part of one device, or separate devices.

The computing device 1001 may operate in a networked environment using logical connections to one or more remote computing devices 1014*a,b,c*. A remote computing device 1014*a,b,c* may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computing device 1001 and a remote computing device 1014*a,b,c* may be made using a network 1015, such as a local area network (LAN) and/or a general wide area network (WAN), or a Cloud-based network. Such network connections may be through a network adapter 1008. A network adapter 1008 may be implemented in both wired and wireless environments. Such networking environments are conventional and commonplace in dwellings, offices, enterprise-wide computer networks, intranets, and the Internet. It is contemplated that the remote computing devices 1014*a,b,c* can optionally have some or all of the components disclosed as being part of computing device 1001. In various further aspects, it is contemplated that some or all aspects of data processing described herein can be performed via cloud computing on one or more servers or other remote computing devices. Accordingly, at least a portion of the system 1000 can be configured with internet connectivity.

EXEMPLARY ASPECTS

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A system comprising: a fiber supply assembly that supplies fiber along a first axis; at least one eyeboard defining a plurality of openings therethrough, wherein each opening of the plurality of openings is configured to receive therethrough a fiber from the fiber supply assembly; a track extending along the first axis, wherein the track passes proximate to each eyeboard of the at least one eyeboard; a carriage that is movable along the track, wherein the carriage defines at least one fiber attachment element; and an actuator that is configured to move the carriage along the track.

Aspect 2: The system of aspect 1, wherein the actuator comprises a hand-grip that is coupled to the carriage, wherein the hand-grip is configured to permit an operator to manually pull the carriage along the track.

Aspect 3: The system of aspect 2, wherein the track comprises a cable, wherein the track has a first end and an opposing second end that is spaced from the first end along the first axis, wherein the track further comprises a first sheave at the first end and a second sheave at the opposing second end, wherein the cable is looped around the first sheave and the second sheave and fixedly coupled to the carriage, wherein the actuator comprises a plurality of hand-grips that are fixedly coupled to the cable in different locations spaced along the first axis, wherein each hand grip of the plurality of hand-grips is configured to permit an operator to manually pull the carriage along the track.

Aspect 4: The system of aspect 1, wherein the at least one eyeboard comprises a plurality of eyeboards that are spaced along the first axis.

Aspect 5: The system of aspect 1 or aspect 4, wherein the track comprises a track beam.

Aspect 6: The system of aspect 5, wherein the track beam supports the carriage at least partially by magnetic levitation.

Aspect 7: The system of any one of aspects 1 or 4-6, wherein the track comprises a cable.

Aspect 8: The system of aspect 7, wherein the track has a first end and an opposing second end that is spaced from the first end along the first axis, wherein the track further comprises a first sheave at the first end and a second sheave at the opposing second end, wherein the cable is looped around the first sheave and the second sheave and fixedly coupled to the carriage.

Aspect 9: The system of any one of aspects 1 or 4-8, wherein the actuator comprises: a first tether coupled to the carriage; and a first winch about which the first tether is configured to be wound, wherein rotation of the first winch in a first rotational direction causes the first tether to wind around the first winch, thereby pulling the carriage in a first direction.

Aspect 10: The system of aspect 9, wherein the actuator further comprises: a second tether coupled to the carriage; and a second winch about which the second tether is configured to be wound, wherein rotation of the second winch in a second rotational direction causes the second tether to wind around the second winch, thereby pulling the carriage in a second direction opposite the first direction.

Aspect 11: The system of aspect 10, wherein each of the first and second winches comprises a stepper motor.

Aspect 12: The system of any one of aspects 1 or 4-11, further comprising: an input device that is configured to receive a user input and, in response to receiving the user input, cause the actuator to move the carriage along the track.

Aspect 13: The system of aspect 12, wherein the carriage comprises: a wheel that is in engagement with the track, wherein the actuator comprises a motor that is coupled to the wheel, wherein the motor is configured to cause the wheel to rotate to move the carriage along the track in response to the user input received by the input device.

Aspect 14: The system of aspect 12 or aspect 13, wherein the motor is a stepper motor.

Aspect 15: The system of any one of aspects 12-14, wherein the input device is a first input device, wherein the system further comprising at least one additional input device to receive a second user input and, in response to receiving the second user input, cause the actuator to move the carriage along the track, wherein the at least one additional input device is spaced from the first input device and is configured to permit user operation from a location that is spaced from the first input device.

Aspect 16: The system of any one of aspects 12-15, wherein the input device is configured to: receive a first signal, and, in response to receiving the first signal, cause the actuator to move the carriage in a first direction along the first axis; and receive a second signal and, in response to receiving the second signal, cause the actuator to move the carriage in a second direction that is opposite the first direction.

Aspect 17: The system of any one of aspects 12-16, wherein the input device comprises a momentary switch.

Aspect 18: The system of any one of aspects 12-17, wherein system further comprises at least one processor and a memory in communication with the at least one processor, wherein: the at least one processor is in communication with the input device; the at least one processor is configured to determine a position of the carriage; the memory is configured to store at least one preset location identifier; each preset location identifier is associated with a respective location of the carriage along the first axis; the input device is configured to receive a user selection of a preset location identifier of the at least one preset location identifier; and in response to the input device receiving the user selection of the preset location of the at least one preset location, the at least one processor is configured to cause the actuator to move the carriage to the preset position.

Aspect 19: The system of aspect 18, wherein the actuator comprises at least one stepper motor, wherein each motor of the at least one stepper motor is in communication with the at least one processor.

Aspect 20: The system of aspect 18 or aspect 19, wherein the system further comprises at least one limit switch in communication with the at least one processor, wherein each limit switch of the at least one limit switch is associated with a respective position of the carriage so that the limit switch is configured to provide a signal to the at least one processor when the carriage reaches the at least one position.

Aspect 21: The system of aspect 20, wherein the at least one limit switch comprises a first switch at a first end of the track and a second limit switch at an opposing second end of the track, wherein the at least one processor is configured to stop movement of the carriage upon receiving a signal from either the first limit switch or the second limit switch.

Aspect 22: The system of any one of the preceding aspects, further comprising at least one arm that is configured to deliver a fiber through an opening of the at least one eyeboard.

Aspect 23: The system of any one of the preceding aspects, wherein the carriage is a first carriage, wherein the system further comprises a second carriage that is configured to receive the fiber from the first carriage.

Aspect 24: The system of any one of the preceding aspects, wherein the fiber supply assembly comprises a creel.

Aspect 25: The system of aspect 24, wherein the creel comprises a plurality of racks, wherein each rack of the plurality of racks comprises a plurality of fiber package engagement structures that are configured to engage respective fiber packages.

Aspect 26: The system of any one of aspects 1-23, wherein the fiber supply assembly comprises a beam upon which fiber is wound.

Aspect 27: A method of using the system as in any one of the preceding claims, the method comprising: coupling a free end of a fiber to the carriage; and causing the carriage to move along the track in a first direction until the carriage is proximate an eyeboard of the at least one eyeboard.

Aspect 28: The method of aspect 27, further comprising: decoupling the free end of the fiber from the carriage; and feeding the free end of the fiber through an opening of the eyeboard.

Aspect 29: The method of aspect 28, further comprising: recoupling the free end of the fiber to the carriage; and moving the carriage along the track in the first direction.

Aspect 30: The method of aspect 29, wherein, prior to feeding the free end of the fiber through the opening of the eyeboard, the carriage is positioned on a first side of the eyeboard, wherein the method further comprises moving the carriage to second side of the eyeboard, opposite the first side of the eyeboard, prior to recoupling the free end of the fiber to the carriage.

Aspect 31: The method of any one of aspects 28-30, wherein the fiber is a first fiber, and wherein the method further comprises coupling the free end of the first fiber to a free end of a second fiber.

Aspect 32: The method of any one of aspects 27-31, wherein causing the carriage to move along the track in the first direction until the carriage is proximate the eyeboard of the at least one eyeboard comprises: pressing a button to move the carriage in the first direction; and releasing the button when the carriage is at or proximate to the eyeboard of the at least one eyeboard.

Aspect 33: The method of any one of aspects 27-31, wherein causing the carriage to move along the track in the first direction until the carriage is proximate the eyeboard of the at least one eyeboard comprises selecting, using an input device, a preset location.

Aspect 34: The method of any one of aspects 27-31, wherein causing the carriage to move along the track in the first direction until the carriage is proximate the eyeboard of the at least one eyeboard comprises preprogramming at least one stopping point.

Although the foregoing invention has been described in some detail by way of illustration and example for purposes of clarity of understanding, certain changes and modifications may be practiced within the scope of the appended claims.

What is claimed is:

1. A system comprising:
    a fiber supply assembly that supplies fiber along a first axis;
    at least one eyeboard defining a plurality of openings therethrough from a first side to a second side, wherein each opening of the plurality of openings is configured to receive therethrough a fiber from the fiber supply assembly;
    a track extending along the first axis, wherein the track passes proximate to each eyeboard of the at least one eyeboard;
    a carriage that is movable along the track from a first position on the first side of a first eyeboard of the at least one eyeboard to a second position on the second side of the first eyeboard, wherein the carriage defines at least one fiber attachment element; and
    an actuator that is configured to move the carriage along the track.

2. The system of claim 1, wherein the actuator comprises a hand-grip that is coupled to the carriage, wherein the hand-grip is configured to permit an operator to manually pull the carriage along the track.

3. The system of claim 2, wherein the track comprises a cable, wherein the track has a first end and an opposing second end that is spaced from the first end along the first axis, wherein the track further comprises a first sheave at the first end and a second sheave at the opposing second end, wherein the cable is looped around the first sheave and the second sheave and fixedly coupled to the carriage, wherein the actuator comprises a plurality of hand-grips that are fixedly coupled to the cable in different locations spaced along the first axis, wherein each hand grip of the plurality of hand-grips is configured to permit an operator to manually pull the carriage along the track.

4. The system of claim 1, wherein the at least one eyeboard comprises a plurality of eyeboards that are spaced along the first axis.

5. The system of claim 1, wherein the track comprises a track beam.

6. The system of claim 5, wherein the track beam supports the carriage at least partially by magnetic levitation.

7. The system of claim 1, wherein the track comprises a cable.

8. The system of claim 7, wherein the track has a first end and an opposing second end that is spaced from the first end along the first axis, wherein the track further comprises a first sheave at the first end and a second sheave at the opposing second end, wherein the cable is looped around the first sheave and the second sheave and fixedly coupled to the carriage.

9. The system of claim 1, wherein the actuator comprises:
    a first tether coupled to the carriage; and
    a first winch about which the first tether is configured to be wound, wherein rotation of the first winch in a first rotational direction causes the first tether to wind around the first winch, thereby pulling the carriage in a first direction.

10. The system of claim 9, wherein the actuator further comprises:
    a second tether coupled to the carriage; and
    a second winch about which the second tether is configured to be wound, wherein rotation of the second winch in a second rotational direction causes the second tether to wind around the second winch, thereby pulling the carriage in a second direction opposite the first direction.

11. The system of claim 1, further comprising: an input device that is configured to receive a user input and, in response to receiving the user input, cause the actuator to move the carriage along the track.

12. The system of claim 11, wherein the carriage comprises: a wheel that is in engagement with the track, wherein the actuator comprises a motor that is coupled to the wheel, wherein the motor is configured to cause the wheel to rotate to move the carriage along the track in response to the user input received by the input device.

13. The system of claim 11, wherein the input device is a first input device, wherein the system further comprising at least one additional input device to receive a second user input and, in response to receiving the second user input, cause the actuator to move the carriage along the track, wherein the at least one additional input device is spaced from the first input device and is configured to permit user operation from a location that is spaced from the first input device.

14. The system of claim 11, wherein the input device is configured to:
    receive a first signal, and, in response to receiving the first signal, cause the actuator to move the carriage in a first direction along the first axis; and
    receive a second signal and, in response to receiving the second signal, cause the actuator to move the carriage in a second direction that is opposite the first direction.

15. The system of claim 11, wherein the input device comprises a momentary switch.

16. The system of claim 11, wherein the system further comprises at least one processor and a memory in communication with the at least one processor, wherein:
    the at least one processor is in communication with the input device;
    the at least one processor is configured to determine a position of the carriage;
    the memory is configured to store at least one preset location identifier;
    each preset location identifier is associated with a respective location of the carriage along the first axis;
    the input device is configured to receive a user selection of a preset location identifier of the at least one preset location identifier; and
    in response to the input device receiving the user selection of the preset location of the at least one preset location, the at least one processor is configured to cause the actuator to move the carriage to the preset position.

17. The system of claim 16, wherein the system further comprises at least one limit switch in communication with the at least one processor, wherein each limit switch of the at least one limit switch is associated with a respective position of the carriage so that the at least one limit switch is configured to provide a signal to the at least one processor when the carriage reaches the respective position of the at least one limit switch.

18. The system of claim 17, wherein the at least one limit switch comprises a first switch at a first end of the track and a second limit switch at an opposing second end of the track, wherein the at least one processor is configured to stop movement of the carriage upon receiving a signal from either the first limit switch or the second limit switch.

19. The system of claim 1, wherein the fiber supply assembly comprises a creel or a beam.

20. A method comprising:
  coupling a free end of a fiber to a carriage of a fiber delivery system, the carriage defining at least one fiber attachment element, the fiber delivery system further comprising:
    a fiber supply assembly that supplies fiber along a first axis;
    at least one eyeboard defining a plurality of openings therethrough from a first side to a second side, wherein each opening of the plurality of openings is configured to receive therethrough a fiber from the fiber supply assembly;
    a track extending along the first axis, wherein the track passes proximate to each eyeboard of the at least one eyeboard, wherein the carriage is movable along the track; and
    an actuator that is configured to move the carriage along the track;
  causing the actuator to move the carriage along the track in a first direction until the carriage is proximate an eyeboard of the at least one eyeboard; and
  causing the actuator to move from a first position on the first side of a first eyeboard of the at least one eyeboard to a second position on the second side of the first eyeboard.

* * * * *